United States Patent [19]

Ishii

[11] Patent Number: 5,029,684
[45] Date of Patent: Jul. 9, 1991

[54] VEHICLE SIDE BRAKE ASSEMBLY
[75] Inventor: Norihiro Ishii, Itami, Japan
[73] Assignee: Kanzaki Kokyukoki Mfg. Co., Ltd., Amagasaki, Japan
[21] Appl. No.: 487,836
[22] Filed: Mar. 5, 1990
[30] Foreign Application Priority Data Mar. 17, 1989 [JP] Japan .................. 1-30690[U]

[51] Int. Cl.⁵ .............. F16D 67/02; F16D 65/42; B62D 11/08
[52] U.S. Cl. ............... 192/13 R; 192/18 R; 192/48.8; 188/196 M; 188/196 V; 180/6.2
[58] Field of Search ............. 192/13 R, 18 R, 48.8, 192/49; 180/6.2, 6.7; 188/196 M, 196 V

[56] References Cited

U.S. PATENT DOCUMENTS

| | | | |
|---|---|---|---|
| 3,151,705 | 10/1964 | Chatham et al. | 188/196 M X |
| 3,572,483 | 3/1971 | Giguere et al. | 192/13 R |
| 3,680,670 | 8/1972 | Hansen | 192/18 R |
| 4,858,739 | 8/1989 | Nemoto | 192/18 R |

FOREIGN PATENT DOCUMENTS 60-23253 7/1985 Japan .
63-43872 2/1988 Japan .................... 180/6.2

Primary Examiner—Richard Lorence

[57] ABSTRACT

A frictional disk-type side brake is disposed within a space around a clutch housing (3) of a side clutch (2). The brake comprises a disk member (4), supported by the clutch housing, and two sets of separate frictional plate members (5A, 5B) supported by a transmission casing (1). The two sets of plate members are particularly disposed such that the disk member is faced, at its angularly spaced two parts, to the two sets of plate members. An adjustable reaction member (8) is provided against which the disk and plate members are pressed so as to actuate the brake. The disk member is prevented, when the brake is actuated, from taking an inclined posture so that a high efficiency and durability of the brake are attained, while a compactness of the brake is assured.

4 Claims, 4 Drawing Sheets

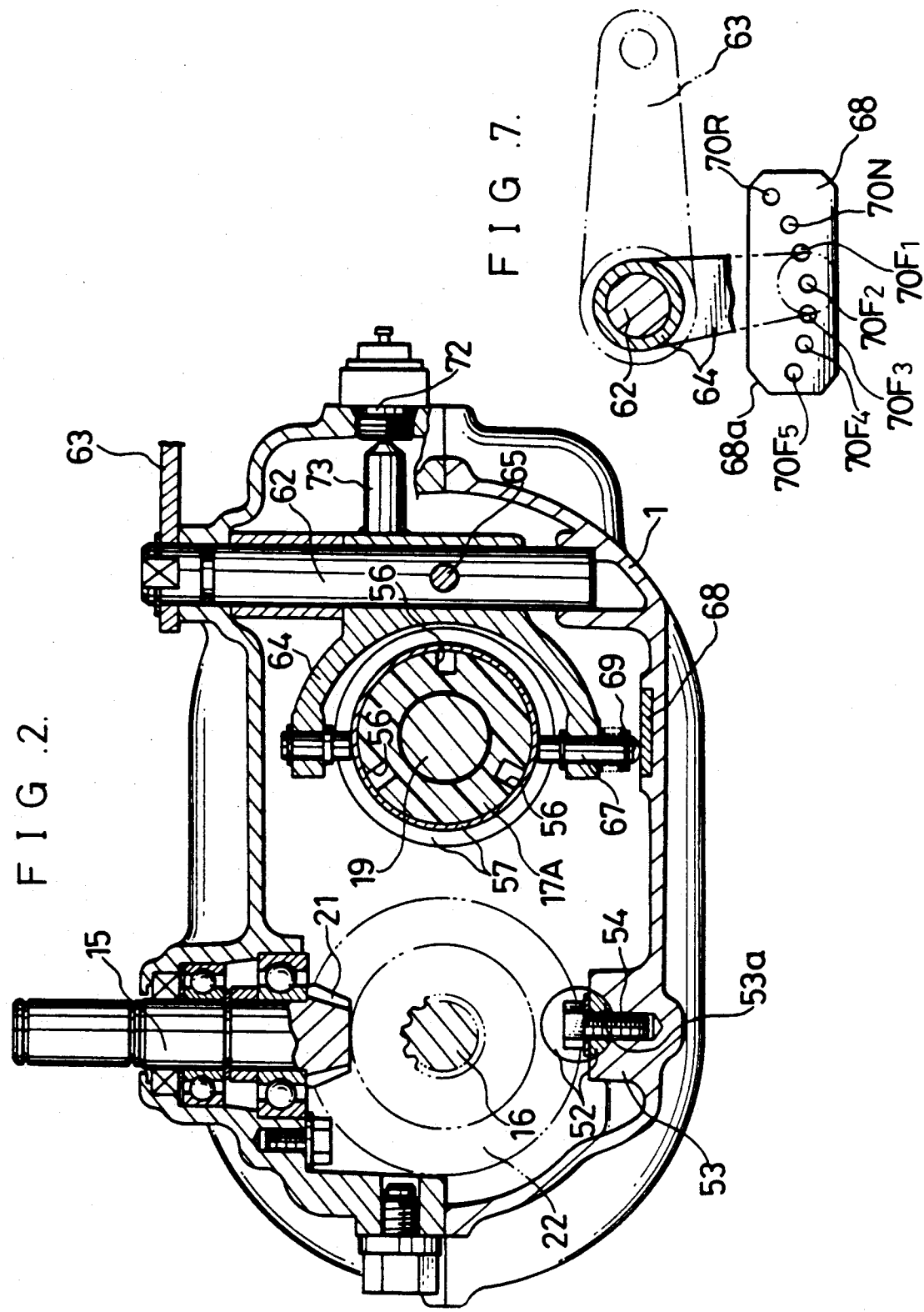

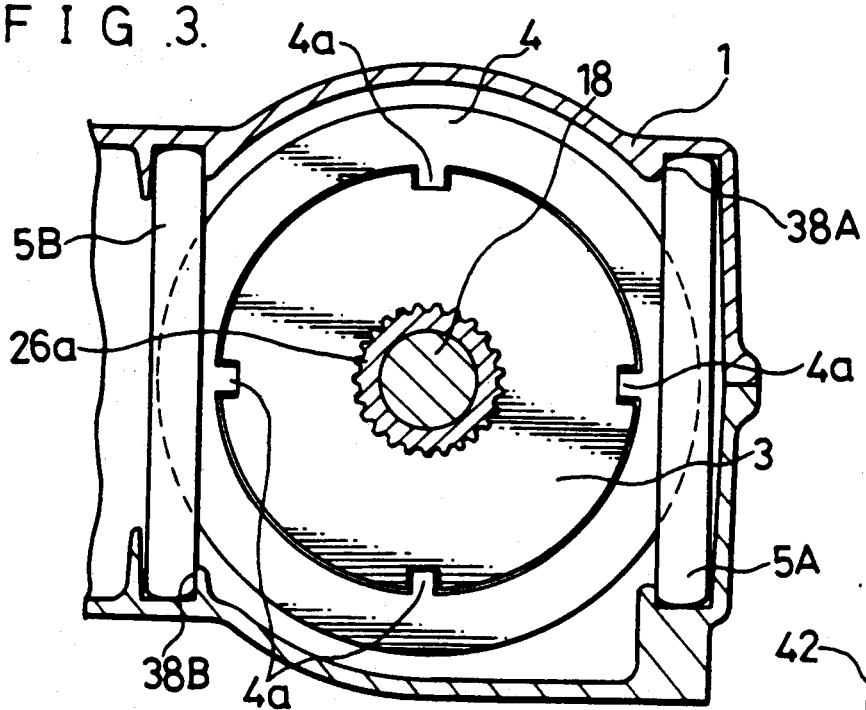
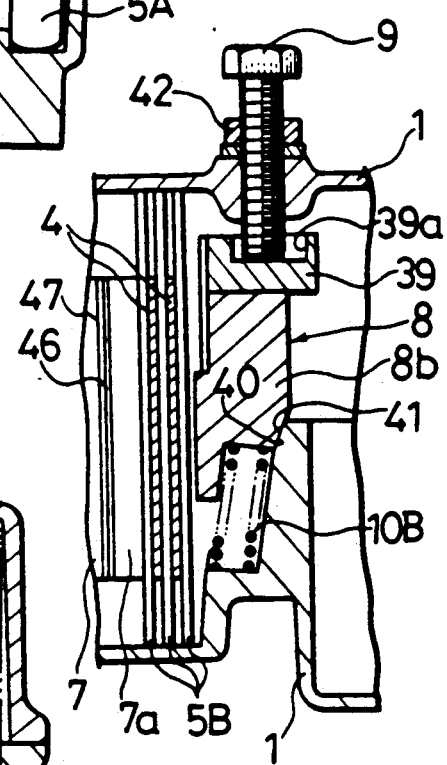
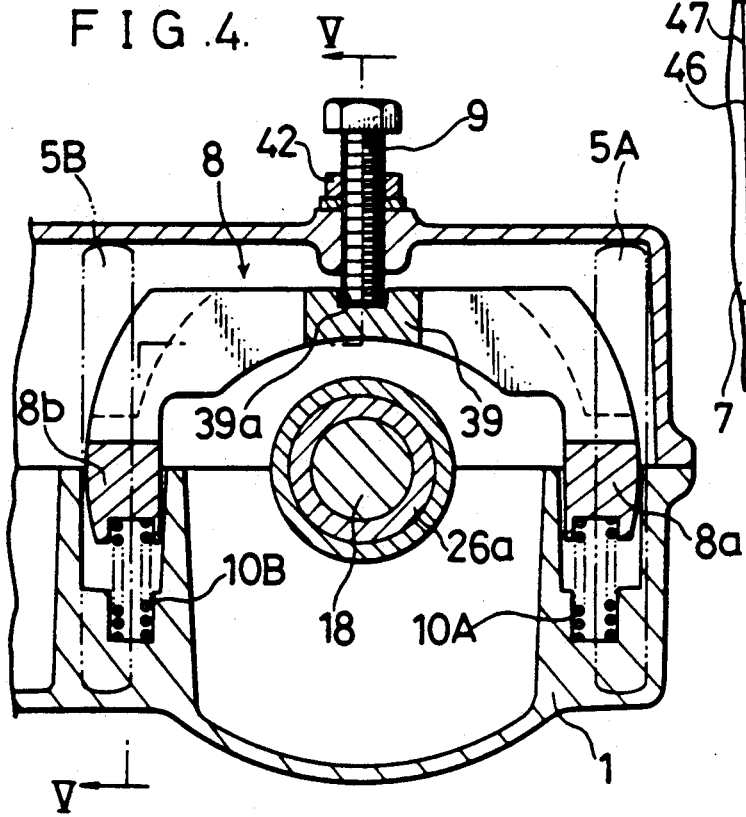

VEHICLE SIDE BRAKE ASSEMBLY

FIELD OF THE INVENTION

This invention relates to a side brake assembly comprising left and right side brakes and used in conjunction with a side clutch assembly comprising left and right side clutches for a vehicle steering purpose in vehicles such as self-propelled walking mowers, mower tractors, and transport vehicles.

BACKGROUND OF THE INVENTION

In a vehicle transmission including frictional disk-type side clutches, frictional disk-type side brakes have been provided in a series arrangement with the side clutches.

A typical example is disclosed in Japanese Utility Model Publication No. 60-23253 in which left and right clutch shafts are disposed co-axially with an output shaft of speed-change mechanism at opposite sides of the output shaft. To one and the other ends of the output shafts are fixedly secured left and right clutch housings which extend towards left and right clutch shafts, respectively. Each of the left and right side clutches is fashioned into a frictional disk-type having opposite sets of frictional elements which are slidably but non-rotatably supported respectively by each clutch housing and by each of the left and right clutch shafts. At the outer sides of such left and right clutches are disposed left and right side brakes of a frictional disk type each of which is fashioned to have opposite sets of frictional elements supported respectively by a transmission casing and by each clutch shaft.

The structure referred to above requires a lengthy transmission casing due to separate clutch shafts disposed at opposite sides of the output shaft and due to the side by side arrangement of respective side clutches and side brakes which arrangement requires prolonged clutch shafts.

For solving such problem, a side brake is considered which is disposed within a space around the clutch housing of a frictional disk-type side clutch so as to brake the clutch housing. However, when such side clutch is fashioned into a frictional disk-type which permits an easy control of braking force, it is required to employ frictional plates or elements of a large diameter as the ones to be supported by a transmission casing. Such frictional plates or elements require a large brake case on an inner wall of the transmission casing so that the size of transmission casing is enlarged correspondingly.

OBJECTS

Accordingly, a primary object of the present invention is to provide a novel side brake assembly comprising left and right side brakes of a frictional disk type in which each of the side brakes is disposed within a space around a clutch housing of each side clutch in a compact fashion. An attendant object of the present invention is to provide a side brake having a high braking efficiency and a prolonged durability with keeping a compactness thereof.

BRIEF DESCRIPTION OF THE DRAWINGS

Other objects and advantages of the invention will become readily apparent as the specification is considered in conjunction with the accompanying drawings, in which:

FIG. 2 is a sectional front view, partially omitted, of the transmission casing shown in FIGS. 1A and 1B;

FIG. 3 is a sectional view taken generally along line III—III of FIG. 1B;

FIG. 4 is a sectional view taken generally along line IV—IV of FIG. 1B;

FIG. 5 is a sectional view taken generally along line V—V of FIG. 4;

FIG. 7 is a sectional view showing another part within the transmission casing shown in FIGS. 1A, 1B and 2.

SUMMARY OF THE INVENTION

Figure 1A:
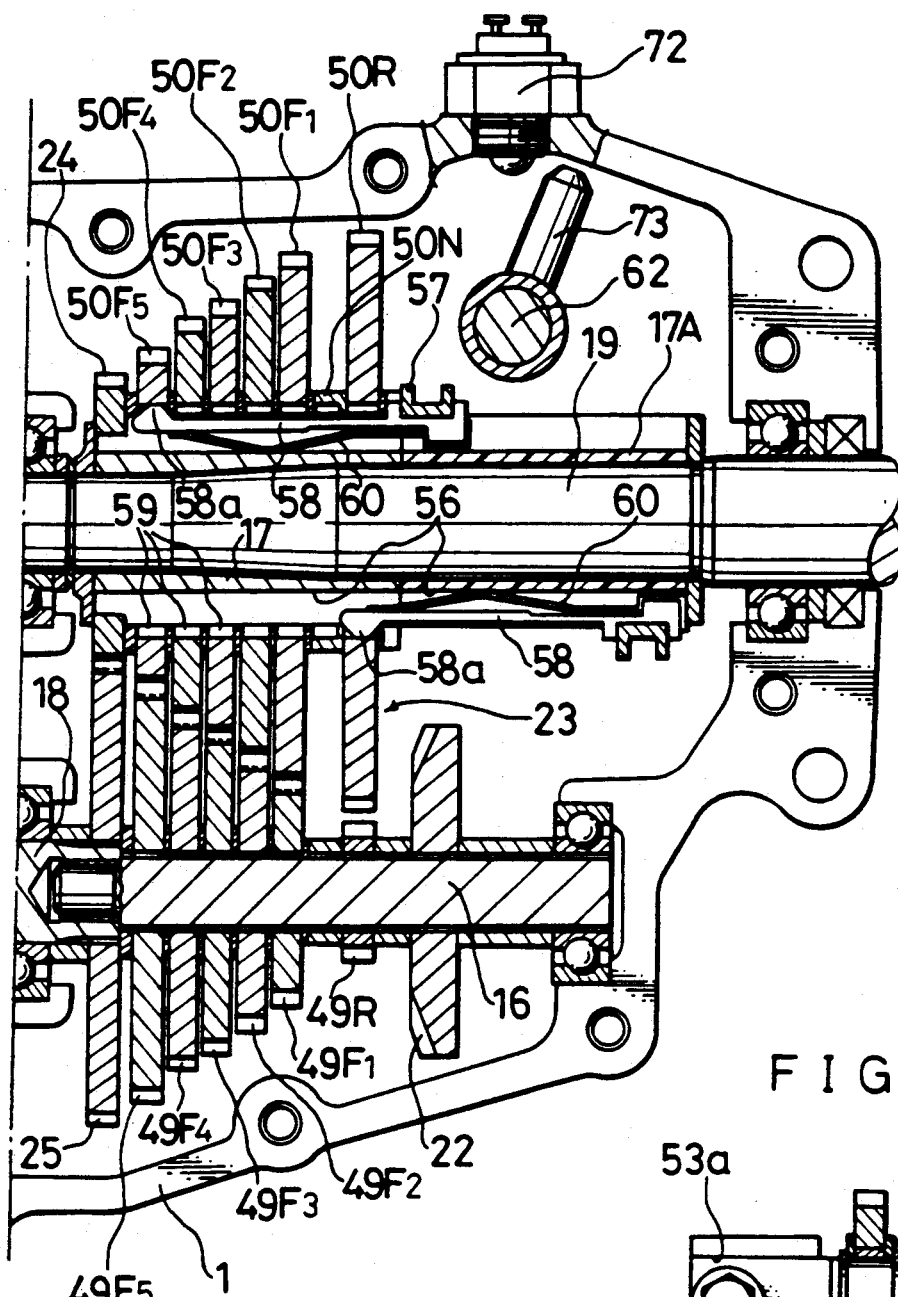
FIG. 1A is a sectional plane view showing a half part of a transmission casing of a vehicle in which an embodiment of the side brake assembly according to the present invention is employed.
Figure 1B:
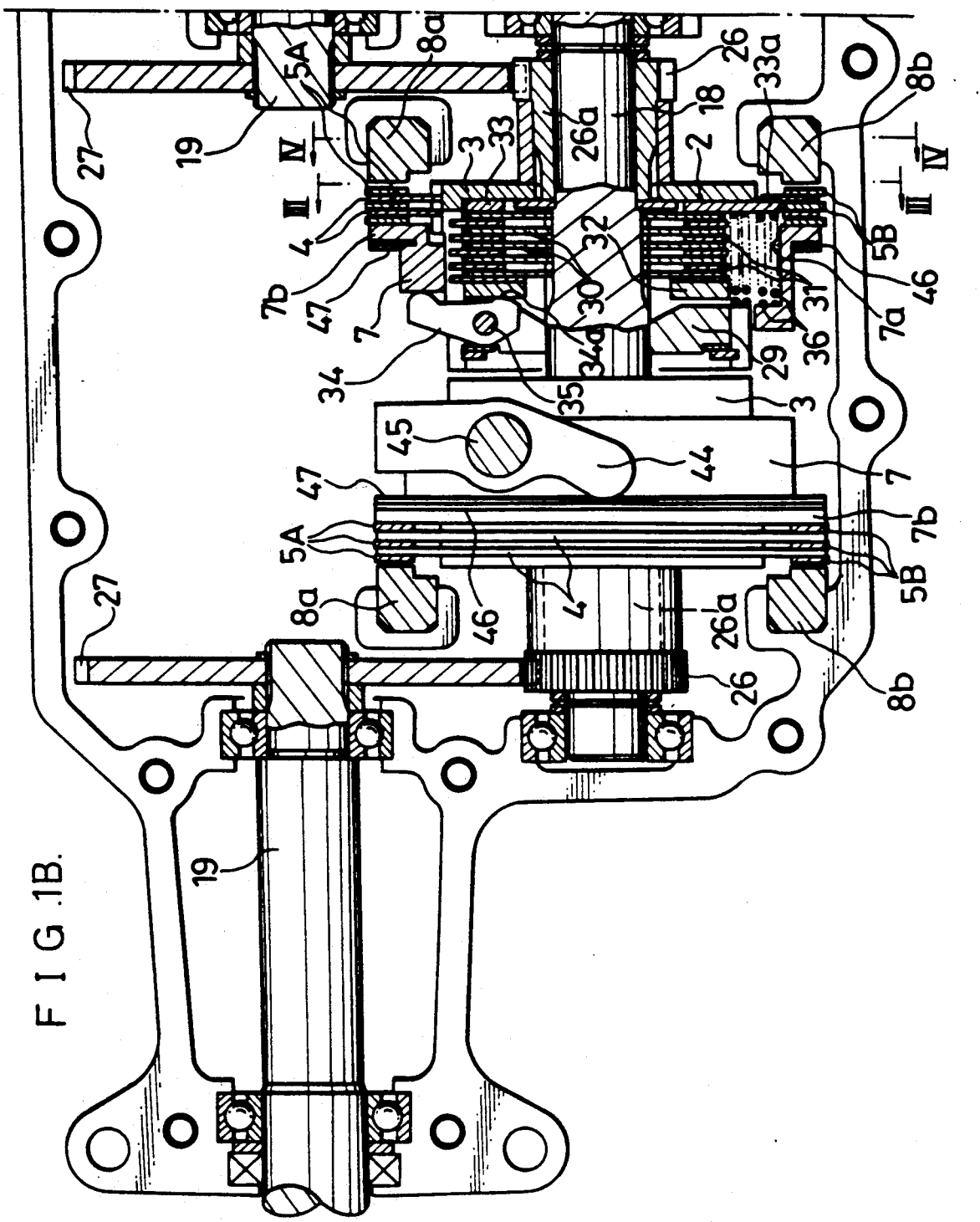
FIG. 1B is a sectional plane view showing the other half part of the transmission casing shown in FIG. 1A.

As shown in FIGS. 1A and 1B, a vehicle transmission includes left and right side clutches 2, which are disposed within a transmission casing 1, and left and right wheel axles 19 which extend sidewards from the transmission casing. Each of the side clutches 2 has a rotatable clutch housing 3 which is connected drivingly to each of the wheel axles 19 using, for example, meshing gears 26 and 27 shown. A side brake assembly is disposed within the transmission casing 1 and comprises left and right side brakes each of which is disposed within a space around the clutch housing 3 of each side clutch 2. A vehicle transmission of this type is shown in U.S. Pat. No. 4,858,739, issued on Aug. 22, 1989 and assigned to the same assignee for the present application, the disclosures of which are incorporated herein by reference.

According to the present invention, each of the side brakes comprises an annular disk member 4 disposed on an outer circumference of each clutch housing 3 and supported by this clutch housing such that the disk member 4 is slidable but non-rotatable relative to the clutch housing; and two sets of spaced apart separate frictional plate members 5A and 5B which are supported non-rotatably by the transmission casing 1 such that these plate members are slidable axially of the clutch housing 3. As clearly shown in FIG. 3, two sets of the frictional plate members 5A and 5B are spaced from each other angularly of the disk member 4 so that the disk member is faced at its angularly spaced two parts to these sets of frictional plate members.

As shown in FIGS. 1B, 4 and 5, each side brake further comprises a reaction member 8 which is supported by the transmission casing 1 such that this reaction member is-non-rotatable but adjustable in position axially of the side clutch towards and away from the frictional plate members 5A and 5B. The reaction member 8 is fashioned to include a pair of spaced apart integral reaction elements 8a and 8b which are faced to the two sets of frictional plate members 5A and 5B.

As shown in FIGS. 4 and 5, an adjusting means (9, 40, 41) is provided which is operable between the transmission casing 1 and reaction member 8 for adjusting the axial position of the member 8.

For actuating the side brake, a slidable shifter sleeve member 7 is disposed on the clutch housing 3, as shown in FIG. 1B, and operable to press the disk member 4 and frictional plate members 5A, 5B against the reaction member 8.

The side brake is actuated by applying an operating force to the shifter sleeve member 7 so as to press the disk member 4 and two sets of the frictional plate member 5A and 5B against the pair of reaction elements 8a and 8b of reaction member 8 to thereby cause a frictional engagement between the disk member and frictional plate members. A slipping engagement between these members and, therefore, a half actuated condition of the side brake may be attained by a control of the operating force applied to shifter sleeve 7.

The side brake disclosed in U.S. Pat. No. 4,858,739 referred to before has a similar structure but includes only one set of frictional plate member which is faced to a part of an annular disk member supported by the clutch housing of a side clutch. In such structure, when the side brake is actuated the disk member may tilt about an edge of the frictional plate member so as to take an inclined posture. This will cause a reduction in frictionally engaged surface area between the disk and plate members so that braking efficiency of the side brake is lowered. Further, a part of the inner peripheral edge of the annular disk member will move away from the outer circumference of the clutch housing due to the inclined posture of annular disk member, whereby the disk member may be damaged.

Contrary to this, the annular disk member 4 employed in the side brake according to the present invention is engaged, when the brake is actuated, at its angularly spaced two parts to two sets of the frictional plate members 5A and 5B so that tilting movement or inclination of the annular disk member is not caused. It is thus seen that a side brake having a high braking efficiency and a prolonged durability is provided by the present invention.

Brake actuation timing may be adjusted by varying the position of reaction member 8 towards and away from two sets of the frictional plate members 5A and 5B. Such adjustment is carried out for compensating manufacturing errors or wearing of the disk member 4 and/or frictional plate members 5A, 5B.

In a preferred embodiment of the present invention, the reaction member 8 is generally U-shaped, as shown in FIG. 4, and is supported by the transmission casing 1 pivotally about a middle point of web portion of the U-letter. The pair of reaction elements 8a and 8b are included in a pair of leg portions of the U-letter, and a pair of spring members 10A and 10B are provided which biases the reaction member 8 to move about the middle point of web portion thereof into opposite directions.

By this, even when the reaction member 8 takes an inclined posture after an adjustment of its axial position so that the pair of reaction elements 8a and 8b are not faced properly to the two sets of frictional plate members 5A and 5B, such reaction member will recover its proper posture spontaneously by a seesaw-like pivotal movement about the middle point of web portion under the biasing of the pair of spring members 10A and 10B.

As shown in FIGS. 4 and 5, means for adjusting the axial position of reaction member 8 preferably includes an adjusting bolt 9 extending a wall of the transmission casing 10 with which bolt the reaction member 8 engages pivotally at the middle point of its web portion under the biasing of the pair of spring members 10A and 10B. Each of the pair of leg portions of the reaction member 8 includes a tapered surface 40 which mates with a corresponding tapered surface 41 on an inner wall of the transmission casing 1 such that when the bolt 9 is moved axially thereof the reaction member 8 is moved in a direction towards and away from the frictional plate members 5A and 5B.

This contributes to a simplicity of the brake structure, because the bolt 9 for adjusting the axial position of reaction member 8 offers a fulcrum for the pivotal movement of such reaction member.

As can be seen, the side brake according to the present invention is disposed within a space around the clutch housing 3 of a side clutch in a compact fashion so as to reduce the size of a transmission casing. Although two sets of the separate frictional plate members 5A and 5B are employed in place of a ring-shaped frictional element or plate and the annular disk member 4 is faced at only two parts thereof to such frictional plate members, the annular disk member supported by the clutch housing has a relatively large outer diameter so that the two parts of such annular disk member provide a relatively large surface area for securing a required capacity of the brake.

The structure according to the present invention in which two sets of frictional plate members 5A and 5B are disposed so that the annular disk member 4 is faced at its angularly spaced two parts to such plate members enhances the efficiency and durability of a side brake, as set forth before, with keeping a compactness of the brake.

DESCRIPTION OF A PREFERRED EMBODIMENT

The embodiment shown is employed in a vehicle transmission shown in FIGS. 1A, 1B and 2.

The transmission casing 1 referred to before is composed of mutually fastened upper and lower halves; and it supports, rotatably, at the upper half, a vertical input shaft 15 which extends through the top wall of casing 1. In the transmission casing are journalled a drive shaft 16, speed-change shaft 17, side clutch shaft 18 and wheel axles 19 all of which extend laterally of a vehicle (not shown). Of these shafts and axles, the drive shaft 16 and side clutch shaft 18 are arranged co-axially with each other. The left and right wheel axles 19, which extend sidewards from the transmission casing 1 and have at the outer ends left and right drive wheels (not shown), are arranged co-axially with the speed-change shaft 17 which is hollow and through which one of the wheel axles 19 extends.

A bevel gear 21 is integrally formed in an inner end portion of the input shaft and meshes with a larger bevel gear 22, fixedly mounted on the drive shaft 16, so as to connect the input shaft 15 drivingly to the drive shaft. A key-shift transmission mechanism 23 is disposed between the drive shaft 16 and speed-change shaft 17. A gear 24 fixedly mounted on one end portion of the speed-change shaft 17 is meshed with a larger gear 25, fixedly mounted on one end portion of the side clutch shaft 18, so as to transmit rotation of the change shaft 17 to the side clutch shaft with a reduced speed of rotation. Left and right output gears 26 are rotatably mounted on the side clutch shaft 18 and are meshed, respectively, with larger gears 27 which are fixedly mounted on inner end portions of the left and right wheel axles 19.

Embodical structure of each of the side clutches and side brakes will be detailed hereinafter by referring to FIG. 1B and FIGS. 3 to 5.

As shown in FIG. 1B, output gears 26 on the side clutch shaft 18 have relatively lengthy boss portions 26a on which clutch housings 3 of the left and right side clutches are fixedly mounted using a splined connection in such an arrangement that these housings 3 extend towards each other. A free end portion of each clutch housing 3 is supported by an annular support block 29 which is in a slidable engagement at its outer and inner circumferences, respectively, with the inner circumference of the clutch housing and with the outer circumference of the side clutch shaft 18.

As shown in FIG. 1B with respect to the side clutch 2 of one side, each of the side clutches is fashioned into a frictional disk-type in which opposite sets of ring-shaped frictional elements 30 and 31 are disposed within the clutch housing 3 and are slidably but non-rotatably supported, respectively, by the side clutch shaft 18 and by the clutch housing. These frictional elements 30 and 31 are sandwiched between a pressure ring 32 and reaction ring 33 disposed in the clutch housing 3. Two or three clutch control arms 34 only one of which is shown in FIG. 1B are disposed in cutout grooves in the support block 29 and are pivotally supported by the block 29 using pins 35. Each of these control arms 34 has an operating projection 34a, abutting against the pressure ring 32, and extends radially outwardly from the clutch housing through a slot in the peripheral wall of housing 10.

The aforestated shifter sleeve member 7 includes in its inner circumference two or three spring-guide grooves 7a in which helical clutch springs 36 are disposed. The reaction ring 33 includes, on its outer periphery, projections 33a which extend radially outwardly from the clutch housing through slots in the peripheral wall of housing 10. The clutch springs 36 are received at their base ends by the projections 33a and act upon the shifter sleeve member 7 at the inner ends of guide grooves 7a so as to force the sleeve member to move towards the outer ends of clutch control arms 34 so that the shifter sleeve member 7 engages with the outer end of each of the clutch control arms under the biasing of clutch springs 36. Consequently, clutch control arms 34 are forced to move about pins 35 into a direction that their operating projections 34a push the pressure ring 32 so as to press the opposite sets of frictional elements 30 and 31 against the reaction ring 33. It is thus seen that the side clutch 2 is kept engaged under the biasing of clutch springs 36.

As shown in FIGS. 1B and 3, two of the aforestated annular disk members 4 are provided to each of the side brakes. Each of these disk members 4 is supported by having projections 4a on its inner circumference extend into elongated axial recesses in the outer circumference of the clutch housing 3 so as to be slidable but non-rotatable relative to the housing. The aforestated two sets of frictional plate members are composed, respectively, of three of the frictional plate members 5A and 5B. These plate members are generally shaped to have a rectangular configuration and are supported non-rotatably by having their both ends extend into two pairs of elongated recesses 38A and 38B which are formed in the inner walls of transmission casing 1 with an interval of about 180 degrees between the two pairs. The shifter sleeve member 7 is shaped to have an annular pushing portion 7b which is faced to the disk members 4 and plate members 5A and 5B. The clutch springs 36 bias the sleeve member 7 to move away from the disk members 4 and plate members 5A, 5B so that the side brake is kept disactuated.

As shown in FIG. 4, the aforestated reaction member 8 is generally U-shaped to have a pair of depending leg portions which extend into a pair of recesses in the inner bottom of transmission casing 1 such that the reaction member is prevented from rotation. The leg portions include the pair of integral reaction elements 8a and 8b. Web portion of the U-shaped reaction member 8 includes at its middle portion a receiving block 39 which has a recess 39a in its upper surface. As shown in FIG. 5 with respect to one of the leg portions having one of the reaction elements 8b, each of the leg portions of reaction member 8 includes the aforestated tapered surface 40 which mates slidably with a corresponding tapered surface 41 on an inner wall of the transmission casing 1. Top wall of the transmission casing 1 has a nut 42, attached to the outer surface of the top wall, with which the aforestated adjusting bolt 9 is threadingly engaged. This bolt extends into the transmission casing and abuts against the bottom of the recess 39a of receiving block 39. The aforestated pair of spring members 10A and 10B are disposed such that they act upon the pair of reaction elements 8a and 8b from the undersides of these elements so as to bias the reaction member 8 upwardly at its leg portions. Consequently, the reaction member engages, at the bottom of recess 39a in the receiving block 39, with the adjusting bolt 9 under the biasing of spring members 10A and 10B.

When the adjusting bolt 9 is rotated so as to be moved axially of it, the reaction member 8 is moved upwardly or downwardly with keeping a slidable engagement of the tapered surfaces 40 with the tapered surfaces 41 under the biasing of spring members 10A and 10B. Consequently, the reaction member 8 is moved, due to engagement between the tapered surfaces 40 and 41, towards or away from the frictional plate members 5A and 5B. As shown in FIG. 5, the width of the recess 39a in the axial direction of the side brake is settled so that the reaction member 8 can be displaced within a predetermined range for a position-adjusting purpose. As stated before, even when the reaction member 8 is inclined during a position-adjusting operation its proper posture shown is recovered spontaneously due to a seesaw-like pivotal movement of the reaction member about the adjusting bolt 9. For smoothening such pivotal movement, outer side surface of each leg portion of the reaction member 8 is arch-shaped, as shown in FIG. 4.

In FIG. 1B, numeral 44 designates one of the legs of a shifter fork, for the side brake of one side, which is supported by the transmission casing 1 pivotally about a pair of co-axially disposed support pins 45 only one of which is shown. This shifter fork is engaged at its legs 44 with the pushing portion 7b of shifter sleeve 7 through a ring 46, fixed to the sleeve, and through a movable ring 47.

Figure 6:
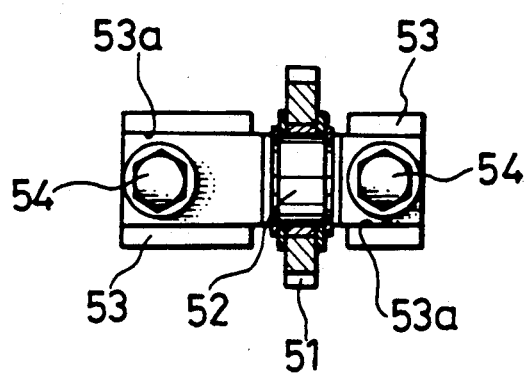
FIG. 6 is a sectional view showing a part within the transmission casing shown in FIGS. 1A, 1B and 2.

As shown in FIG. 1A, the key-shift transmission mechanism 23 referred to before includes forward direction first- to fifth-speed gears $49F_1$, $49F_2$, $49F_3$, $49F_4$ and $49F_5$, fixedly mounted on the drive shaft 16, and forward direction first- to fifth-speed gears $50F_1$, $50F_2$, $50F_3$, $50F_4$ and $50F_5$ rotatably mounted on the speed-change shaft 17. Corresponding two gears of these gears $49F_1$–$49F_5$ and $50F_1$–$50F_5$ are meshed respectively so as to provide five forward direction speed-change gear trains between the shafts 16 and 17. A backward direction gear 49R is fixedly mounted on the drive shaft 16, and another backward direction gear 50R is rotatably mounted on the speed-change shaft 17. These backward direction gears 49R and 50R are connected corotatably via an idler gear 51 shown in FIG. 5. As shown in FIGS. 2 and 6, support shaft 52 for rotatably supporting the idler gear 51 has generally semi-circular end portions which are received in correspondingly shaped grooves 53a in the upper surfaces of a pair of bosses 53 on the inner bottom of transmission casing 1. The end portions of support shaft 52 are secured to the pair of bosses 53 using bolts 54.

As shown in FIGS. 1A and 2, an axial half of the hollow speed-change shaft is composed of a hollow support shaft 17A of a polymer material. In the outer surfaces of the shafts 17 and 17A are formed elongated axial grooves 56 within which shift keys 58 are slidably disposed. These shift keys 58 are connected at their base end portions to a shifter collar 57 which is slidably mounted on the support shaft 17A. Each of the shift keys 58 has, at its free end, a gear-engaging lug 58a and is biased by a leaf spring 60 so that the gear-engaging lug 58a projects outwardly of the change shaft 17. In the inner circumference of each of the gears 50F$_1$-50R on the speed-change shaft are formed recesses 59 into which the gear-engaging lugs 58a of shift keys 58 may project.

A vertically extending control shaft 62 shown in FIGS. 1B, 2 and 7 is rotatably supported by the transmission casing 1 and has a top end portion, extending upwardly from the casing 1, to which a control arm 63 is attached for providing a rotation to the control shaft 62. As shown in FIG. 2, a shifter fork 64 which engages with shifter collar 57 is attached to the control shaft 62 using a pin 65. The shifter collar 57 is moved selectively by a pivotal movement of the shifter fork 64 to one of the positions on the support shaft 17A where gear-engaging lugs 58a of the shift keys 58 project into recesses 59 of one of the gears 50F$_1$-50R or into an annular groove of a neutral collar 50N which is disposed on the change shaft 17 and between the gears 50F$_1$ and 50R.

As shown in FIG. 2, both of the legs of the shifter fork 64 have at their free ends pins at which the fork 64 engages with the shifter collar 57. One of these pins 67 is supported slidably and engages, at its spherical end face, slidably with a detent plate 68 on the inner bottom of transmission casing 1 under the biasing of a coil spring 69. As shown in FIG. 7, the detent plate 68 includes detenting bores 70F$_1$-70F$_5$, 70R and 70N at which the pin 67 rests, respectively, in the forward direction first- to fifth-speed, backward direction and neutral conditions of the key-shift transmission mechanism 23. One of the corners 68a of the detent plate 68 is chamfered largely for indicating a direction along which the detent plate is to be fitted into a correspondingly shaped recess in the inner bottom of transmission casing 1.

In FIGS. 1A and 2, numeral 72 designates a neutral condition-detecting switch which is operated by an operating pin 73 attached to the shifter fork 64 so as to detect the neutral condition of the key-shift transmission mechanism 23. This detecting switch 72 will also operate, when the transmission mechanism 23 is shifted between its forward and backward direction conditions, to provide a resistance against the shifting operation so as to avoid a sudden change of rotational directions.

In the transmission shown, the key-shift transmission mechanism 23 provides the first to fifth forward direction speeds and a backward direction speed to a vehicle by coupling the gears 50F$_1$-50F$_5$ and 50R, one at a time, to the speed-change shaft 17 by means of clutch-engaging lugs 58a of the shift keys 58.

When the vehicle is to be turned, the shifter fork 44 (FIG. 1B) of one or the other side is operated so as to slide the shifter sleeve 7 of that side against the biasing force of clutch springs 36. By this operation, force of the clutch springs 36 applied to the pressure ring 32 via the clutch arm 34 is reduced so that the side clutch 2 is disengaged through a slipping or half-clutch condition.

When the shifter fork 44 is further operated, the pushing portion 7b of shifter sleeve 7 is displaced to a position where it presses the disk members 4 and frictional plate members 5A, 5B against the reaction elements 8a and 8b of reaction member 8. Consequently, the side brake is actuated through a slipping condition. Actuation timing of the side brake after the disengagement of side clutch 2 may be varied by adjusting the axial position of reaction member 8.

I claim:

1. In a vehicle transmission which includes left and right side clutches disposed within a transmission casing and left and right wheel axles extending sidewards from said transmission casing, each of said side clutches having a rotatable clutch housing which is connected drivingly to each of said wheel axis, a side brake assembly disposed within said transmission casing and having left and right side brakes each of which comprises:
   an annular disk member (4) disposed on an outer circumference of said clutch housing (3) and supported by said clutch housing slidably but non-rotatably relative to said clutch housing;
   two sets of spaced apart separate frictional plate members (5A, 5B) supported slidably but non-rotatably by said transmission casing (1), said two sets of frictional plate members being disposed in face-to-face relation with said disk member (4);
   a reaction member (8) supported by said transmission casing (1) such that said reaction member is non-rotatable but adjustable in position axially of the side brake towards and away from said two sets of frictional plate members (5A, 5B), said reaction member having a generally U-shaped configuration including a web portion and a pair of leg portions and being supported further by said transmission casing pivotally about a middle point of said web portion;
   a pair of reaction elements (8a, 8b) carried by said pair of leg portions of said reaction member (8) such that said pair of reaction elements are opposed axially of the side brake to said two sets of frictional plate members (5A, 5B);
   an adjusting means (9, 40, 41) operable between said transmission casing (1) and said reaction member (8) for adjusting the axial position of said reaction member;
   a pair of spring members (10A, 10B) for biasing said reaction member (8) to move about said middle point of said web portion into opposite directions; and
   a shifter sleeve member (7) disposed slidably on said clutch housing (3) for pressing said disk member (4) and said two sets of frictional plate members (5A, 5B) against said pair of reaction elements (8a, 8b).

2. A side brake assembly as set forth in claim 1 wherein said pair of spring members are composed of a pair of compression coil springs (10A, 10B) which act upon said pair of leg portions of said reaction member (8).

3. A side brake assembly as set forth in claim 2 wherein said adjusting means includes an adjoining bolt (9) extending through a wall of said transmission casing (1) with which bolt said reaction member (8) engages pivotally at said middle point of said web portion under the biasing of said pair of spring members (10A, 10B), each of said pair of leg portions of said reaction member including a tapered surface (40) mating with a corresponding tapered surface (41) on an inner wall of said transmission casing such that when said adjusting bolt is moved axially thereof said reactive member is moved in a direction towards and away from said frictional plate members (5A, 5B).

4. A side brake assembly as set forth in claim 1 wherein said adjusting means includes an adjusting bolt (9) extending through a wall of said transmission casing (1) with which bolt said reaction member (8) engages pivotally at said middle point of said web portion under the biasing of said pair of spring members (10A, 10B), each of said pair of leg portions of said reaction member including a tapered surface (40) mating with a corresponding tapered surface (41) on an inner wall of said transmission casing such that when said adjusting bolt is moved axially thereof said reaction member is moved in a direction towards and away from said frictional plate members (5A, 5B).

* * * * *

UNITED STATES PATENT AND TRADEMARK OFFICE
CERTIFICATE OF CORRECTION

PATENT NO. : 5,029,684
DATED : July 9, 1991
INVENTOR(S) : Norihiro Ishii

It is certified that error appears in the above-identified patent and that said Letters Patent is hereby corrected as shown below:

Col. 8, line 26 change "axis," to --axles,--.

Col. 9, line 4 change "adjoining" to --adjusting--.

Col. 9, line 15 change "reactive" to --reaction--.

Signed and Sealed this

Thirteenth Day of October, 1992

*Attest:*

DOUGLAS B. COMER

*Attesting Officer*     *Acting Commissioner of Patents and Trademarks*